US011992956B2

(12) United States Patent
Jessen et al.

(10) Patent No.: US 11,992,956 B2
(45) Date of Patent: May 28, 2024

(54) COORDINATION SYSTEM, HANDLING DEVICE, AND METHOD

(71) Applicant: Robert Bosch GmbH, Stuttgart (DE)

(72) Inventors: Simon Jessen, Ditzingen (DE); Felix Beuke, Munich (DE); Sergey Alatartsev, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 960 days.

(21) Appl. No.: 16/965,165

(22) PCT Filed: Jan. 3, 2019

(86) PCT No.: PCT/EP2019/050072
§ 371 (c)(1),
(2) Date: Jul. 27, 2020

(87) PCT Pub. No.: WO2019/158270
PCT Pub. Date: Aug. 22, 2019

(65) Prior Publication Data
US 2021/0053228 A1    Feb. 25, 2021

(30) Foreign Application Priority Data
Feb. 15, 2018    (DE) .......................... 102018202321.2

(51) Int. Cl.
*B25J 9/16*    (2006.01)

(52) U.S. Cl.
CPC .......... *B25J 9/1682* (2013.01); *B25J 9/1666* (2013.01); *G05B 2219/40463* (2013.01); *G05B 2219/40512* (2013.01); *G05B 2219/40516* (2013.01)

(58) Field of Classification Search
CPC ................. B25J 9/1682; B25J 9/1666; G05B 2219/40463; G05B 2219/40512; G05B 2219/40516
See application file for complete search history.

(56) References Cited

U.S. PATENT DOCUMENTS

| 9,744,668 B1 * | 8/2017 | Russell .................. B25J 9/1666 |
| 2009/0326711 A1 * | 12/2009 | Chang .................... B25J 9/1666 700/255 |

(Continued)

FOREIGN PATENT DOCUMENTS

| CN | 105922265 A | 9/2016 |
| CN | 105943163 A | 9/2016 |

(Continued)

OTHER PUBLICATIONS

IEEE International conference on advanced intelligent mechatronics (AIM), title: "Composition of dynamic roadmaps for dual arm motion planning"; Germany, Jul. 3-7, 2017 by ("Volz") (Year: 2017).*

(Continued)

*Primary Examiner* — Sohana Tanju Khayer
(74) *Attorney, Agent, or Firm* — NORTON ROSE FULBRIGHT US LLP; Gerard A. Messina

(57) ABSTRACT

A coordination system for a handling device including a plurality of kinematic chains is provided. Each of the kinematic chains being movable in a workspace. At least two of the workspaces having an overlap, the kinematic chains being designed to carry out a work movement based on a work command. The coordination system includes a trajectory planning module and a control module. The control module is designed to activate the kinematic chains to carry out the work movement based on trajectory data. The trajectory planning module is designed to determine the trajectory data to carry out the work movement and to (Continued)

provide the trajectory data to the control module. The trajectory planning module is designed, if a further work command is provided while the work movement is being carried out, to replan the trajectory data into replanned trajectory data and provide these data to the control module.

16 Claims, 6 Drawing Sheets

(56) References Cited

U.S. PATENT DOCUMENTS

| | | | |
|---|---|---|---|
| 2012/0191333 A1* | 7/2012 | Sawhill | G08G 5/0052 |
| | | | 701/122 |
| 2013/0304256 A1* | 11/2013 | Moll | A61B 34/30 |
| | | | 700/247 |
| 2015/0336269 A1 | 11/2015 | Linnell et al. | |
| 2016/0129596 A1* | 5/2016 | Pfaff | B25J 9/1682 |
| | | | 700/255 |
| 2016/0207198 A1* | 7/2016 | Willför | B25J 9/1676 |
| 2018/0122125 A1* | 5/2018 | Brewster | G06T 13/40 |
| 2018/0236657 A1* | 8/2018 | Kuwahara | B25J 9/1605 |
| 2019/0232496 A1* | 8/2019 | Graichen | B25J 9/1666 |
| 2019/0369600 A1* | 12/2019 | Lager | B25J 9/0093 |
| 2021/0023719 A1* | 1/2021 | Alt | B25J 9/1697 |
| 2021/0221614 A1* | 7/2021 | Kollmuss | B25J 9/1687 |

FOREIGN PATENT DOCUMENTS

| | | |
|---|---|---|
| CN | 106166749 A | 11/2016 |
| CN | 106166750 A | 11/2016 |
| CN | 106444738 A | 2/2017 |
| CN | 107443373 A | 12/2017 |
| DE | 102013014287 A1 | 3/2014 |
| JP | 2013027953 A | 2/2013 |
| JP | 2013215867 A | 10/2013 |
| WO | 2011150534 A1 | 12/2011 |

OTHER PUBLICATIONS

IEEE/RSJ International conference on intelligent robots and systems (IROS), title "Online planning of optimal trajectories on assigned paths with dynamic constraints for robot manipulators", Korea Oct. 9-14, 2016, by ("Casalino") (Year: 2016).*

Proceedings of the twenty second international conference on automated planning and scheduling, title "ITOMP: Incremental trajectory optimization for real-time replanning in dynamic environments", 2012, by ("Park") (Year: 2012).*

Kunz, et al.: "Real-Time Path Planning for a Robot Arm in Changing Environments," The 2010 IEEE/RSJ Int'l Conf. on Intelligent Robots & Systems, Taiwan, (2010), pp. 1-6.

International Search Report for PCT/EP2019/050072, dated Apr. 8, 2019.

Volz Andreas et al., "Composition of Dynamic Roadmaps for Dual-Arm Motion Planning," 2017 IEEE International Conference on Advanced Intelligent Mechatronics (AIM), IEEE, 2017, pp. 1242-1248. XP033144488.

Chonhyon Park et al., "ITOMP: Incremental Trajectory Optimization for Real-Time Replanning in Dynamic Environments," 2012, pp. 207-215. XP055576235.

Casalino Andrea et al., "Online Planning of Optimal Trajectories on Assigned Paths With Dynamic Constraints for Robot Manipulators," 2016 IEEE/RSJ International Conference on Intelligent Robots and Systems (IROS ), IEEE, 2016, pp. 979-985. XP033011518.

Kris Hauser, "On Responsiveness, Safety, and Completeness in Real-Time Motion Planning," Autonomous Robots, Kluwer Academic Publishers, vol. 32, No. 1, 2011, pp. 35-48. XP019995236.

* cited by examiner

COORDINATION SYSTEM, HANDLING DEVICE, AND METHOD

A coordination system is provided for a handling device including a plurality of kinematic chains. The kinematic chains are movably arranged in a workspace, at least two of the workspaces having an overlap and the kinematic chains being designed to carry out a work movement based on a work command. The coordination system includes a trajectory planning module and a control module.

BACKGROUND INFORMATION

The use of robots in the automation of processes and in particular in industrial manufacturing is conventional in the related art. In particular, it has been shown in recent years that more and more the use of multi-arm robots and especially two-arm robots is increasing and appears to have a promising future. It is conventional in the related art to handle the arms of multi-arm robots separately, as if they were independent arms. The programming for a controller of such robots is therefore very complex.

German Patent Application No. DE 10 2013 014 287 A1 describes a method for connecting fine-mechanical components by laser welding having the following steps: gripping a first component from a first magazine area using a first gripper provided on a first robot arm. Gripping a second component from a second magazine area using a second gripper provided on a second robot arm for holding the first component using the first gripper and holding the second component using the second gripper in relation to one another and in relation to a laser device in a first assembly position. Activating the laser device and connecting the first and second component to one another. Depositing the assembly with the aid of the first gripper in a deposit area.

SUMMARY

In accordance with the present invention, a coordination system for a handling device is provided. Furthermore, in accordance with the present invention, a handling device and a method for coordinating the handling device are provided. Further advantages and effects result from the description herein.

In accordance with an example embodiment of the present invention, a coordination system for a handling device is provided. In particular, the coordination system is designed to activate the handling device, for example, to coordinate its arms and/or kinematic chains, to operate and/or adjust the handling device. The coordination system may in particular be designed as software. The coordination system is particularly preferably designed to carry out planning and execution steps in a handling device constructed according to the measure-planning-execute model.

The handling device is designed, for example, as a robot. The robot may be a stationary or a mobile robot. The handling device is preferably designed as a device of industrial automation technology. Alternatively and/or additionally, the handling device may be designed as a service robot, for example, as a vacuum cleaner robot. The handling device is designed, for example, as a manufacturing workplace or as an assembly place and/or is part of a manufacturing workplace or assembly place. The handling device is designed to carry out, for example, an assembly step or a manufacturing step. The handling device is preferably designed as a multi-arm robot or especially as a two-arm robot. For example, the robot is designed as an articulated robot. The robot is especially a multi-axis robot. Furthermore, the handling device may also include a plurality of robots.

The handling device includes a plurality of kinematic chains. The handling device preferably includes two kinematic chains. The kinematic chains are designed in particular as robot arms, also referred to in short as arm hereinafter. An end effector is preferably situated at the end of the kinematic chain. Each of the kinematic chains is movable in a workspace. In particular, the end effector is movable in the workspace. The workspace is, for example, a six-dimensional space. Preferably, every point of the workspace is reachable by the kinematic chain and/or by the end effector. At least two of the workspaces and/or exactly two workspaces have an overlap. The overlap may completely include one and/or both workspaces. Alternatively, the overlap between the two workspaces includes only a part of each of the individual workspaces.

The kinematic chains are designed to carry out a work movement. In particular, the kinematic chains are designed to carry out a work movement based on a work command. The work command is, for example: pick up an object from this position. The work command is preferably designed for a kinematic chain and/or associated with a kinematic chain in each case. The work movement is used, for example, to carry out the production and/or assembly step. The work movement is, for example, the approach of a point and/or a coordinate including the end effector.

In accordance with an example embodiment of the present invention, the coordination system includes a trajectory planning module and a control module. The trajectory planning module and/or control module may be designed, for example, as a computer unit, a processor, or a microchip. For example, the trajectory planning module and control module are designed as a shared computer unit.

In accordance with an example embodiment of the present invention, the control module is designed to activate the kinematic chains to carry out the work movement based on trajectory data. For example, the trajectory data are a trajectory function which associates a point in time with a location of the end effector in space and/or which prescribes an angle position of joints of the handling device for a point in time. Alternatively, the trajectory data are designed as a data tuple, which associates further data with a point in time, these associated data being able to describe a state of the kinematic chain. In particular, separate trajectory data are necessary for every work movement.

In accordance with an example embodiment of the present invention, the trajectory planning module is designed to determine the trajectory data to carry out the work movement. The trajectory planning module includes a trajectory coordinator or is designed as a trajectory coordinator. The trajectory planning module determines, for example, which trajectory is possible for carrying out the work movement and/or work command. In particular, the trajectory planning module determines a collision-free trajectory. The trajectory planning module takes into consideration, for example, a work movement based on a further work command and/or work commands for other kinematic chains during the trajectory planning. The trajectory planning module is designed to provide the trajectory data to the control module. For example, trajectory planning module and control module are data-technologically connected to one another. Furthermore, it may be provided that a trajectory buffer module is situated between trajectory planning module and control module, which buffers the trajectory data of the trajectory planning module before it passes on the trajectories completely or partially to the control module.

The example trajectory planning module is designed, if a further work command is provided while the work movement is carried out, to replan the trajectory data into replanned trajectory data and pass these data on to the control module. The further work command is first provided in particular at a later point in time than the original work command. A work command which does not have any replanned trajectory data is understood in particular as an original work command. The control module is preferably designed to use the replanned trajectory data as new trajectory data. The trajectory planning module thus does not abort the original work movement if a further work command is provided and/or arrives, but rather continues to carry out the original work command and plans meanwhile a replanned trajectory having replanned trajectory data, after the replanning, the replanned trajectory data being provided to the control module and in particular the work movements being carried out using the replanned trajectories. Therefore, in particular simultaneously with carrying out the work movement, a trajectory is planned for the further work command and in particular the original trajectory having the original trajectory data is replanned in such a way that the original work command and the new work command may be carried out simultaneously.

The replanning is preferably a reparameterization of the trajectory data into the replanned trajectory data. The replanned trajectory data may in particular also be understood as coordinated trajectory data. The replanning is carried out especially by the trajectory coordinator. The replanning replans the original trajectories and/or reparameterizes them in such a way that the movements and/or replanned trajectories may be carried out jointly free of collisions. For example, the replanned trajectory is the original trajectory, which is carried out at a different velocity, however. Parts of the trajectory are especially carried out accelerated or decelerated. For example, in the case of a work movement using two robot arms, the trajectory of one arm is carried out more slowly, or the arm is partially decelerated, while the other arm continues to carry out its movement, so that a collision of the arms does not take place. The replanning and/or reparameterization takes place in particular in real time.

The present invention is based on the consideration of providing a higher-performance coordination system, in particular to be able to coordinate and/or activate the handling device faster. The provided coordination system is therefore both reactive and responsive. The coordination of the handling device takes place dynamically with the aid of the coordination system.

One example embodiment of the present invention provides that the trajectory planning module is designed to only replan the trajectory data into the replanned trajectory data starting at a buffer point in time. The buffer point in time is a point in time in the future computed out from an event point in time, the buffer point in time being after the event point in time by a buffer time interval. The event point in time is in particular a point in time at which the further work command is present and/or is provided. In particular, the event point in time may also be the present point in time when carrying out the work movement. Especially, the event point in time may be the present point in time. The buffer time interval may be a fixed time interval or a flexible time interval. The buffer time interval is preferably in the millisecond range and/or less than one second. This design is based on the consideration that the control module activates the handling device having the non-replanned trajectory data up to the buffer point in time, only replans the trajectory data to the replanned trajectory data from the buffer point in time, and activates the handling device using the replanned trajectory data starting at the buffer point in time.

The example control module is optionally designed to activate the kinematic chains to carry out the work movement based on the original trajectory data at least up to a guarantee point in time. The original trajectory data are in particular non-replanned trajectory data. The guarantee point in time is a point in time after the event point in time, the guarantee point in time being after the event point in time by a guarantee time interval. In particular, trajectory data from the trajectory planning module which are before the guarantee point in time are not replannable. Trajectory data before the guarantee point in time are therefore carried out unchangeably by the kinematic chains.

It is particularly preferable for the guarantee point in time to be identical to the buffer point in time. Alternatively, the guarantee point in time is an earlier point in time than the buffer point in time.

One example embodiment of the present invention provides that the trajectory planning module is designed to determine a minimal time trajectory as preliminary trajectory data for each of the kinematic chains, the coordination system including a coordination module, the coordination module being designed to reparameterize the preliminary trajectory data based on the minimal time trajectory into the trajectory data, so that the overall movement is free of collisions. A trajectory which requires the shortest time to carry out the work movement is preferably understood as a minimal time trajectory. A minimal time trajectory is especially the trajectory for the work movement which results in a shortest execution period for the work movement for a given path in consideration of dynamic restrictions of the handling device and/or the kinematic chain.

The trajectory planning module is optionally designed to determine the minimal time trajectory based on a finite maximum acceleration and/or a finite maximum velocity of the kinematic chain and/or a joint of the kinematic chain. In particular, a finite adjustment velocity and/or a finite adjustment acceleration of the kinematic chain are understood as restrictions.

In particular, the coordination system includes a masking module. The masking module may be a software module or a hardware module. In particular, the masking module is part of the control module and/or part of the trajectory planning module. The masking module is designed to shield trajectory data for the control module which are presently being replanned and/or have a later point in time than a maximum read ahead point in time. The maximum read ahead point in time is before the present point in time by a read ahead time interval. The maximum read ahead point in time is therefore in particular a dynamic point in time, which also shifts as time elapses. The trajectory data are thus always only passed on piece by piece to the control module by the masking module, so that the control module only sees trajectory data in each case which are in the future by the read ahead time interval.

It is particularly preferable for the coordination system to include an estimation module. The estimation module is designed as software or hardware, for example, the estimation module is a computer unit. The estimation module is designed to estimate a planning time interval. The planning time interval is in particular the period of time which is required for reparameterizing and/or replanning the trajectory data. In particular, the planning time interval is a fixed time interval, for example, several microseconds or seconds, alternatively, the planning time interval is a dynamic time interval which is a function of the complexity of the reparameterization and/or replanning of the trajectory data.

The buffer point in time is optionally a point in time which is after the event point in time, the buffer point in time being after the event point in time by the planning time interval. Furthermore, it may be provided that the maximum read ahead point in time is defined as the point in time which is in the future by the planning time interval starting at the event point in time.

It is particularly preferable for the buffer point in time to correspond to a point in time which may be calculated as the event point in time plus buffer time interval plus planning time interval. This design is based on the consideration of providing a coordination system for which it is ensured that up to the buffer point in time, the handling device is newly activatable using the replanned trajectory data.

In particular, the buffer point in time is a point in time less than or equal to, preferably earlier or equal to, the maximum read ahead point in time. This design is based on the consideration that the control module sees enough of the trajectory that in addition to the buffer time, for example, it may also take into consideration the planning time.

The coordination system is in particular a reactive and/or responsive coordination system for a multi-arm, in particular two-arm robot. The arm coordination of the robot arms using the coordination system is in particular the locating of a collision-free trajectory for the robot arms in a shared workspace. Responsive in this context means in particular that the planning of a new work movement occupies less time than physically carrying out the work movement. Reactive in this context preferably means that the original plan and/or the original work movement may be refined if a further work command is provided. The coordination system in particular enables the handling device to not have to stop if a further work command is provided, but rather be able to continue to work, so that the added value of a handling device may be increased.

The coordination system is designed in particular for handling devices including multi DOF (degrees of freedom) and/or for low DOF. Multi DOF systems are, for example, industrial robots, for example, low DOF systems being mobile robots. The coordination system is in particular for handling devices including changeable velocity profiles. The coordination system and/or the trajectory planning module is preferably designed to decide which kinematic chain and/or which work movement has priority over another.

A handling device forms a further subject matter of the present invention. In accordance with an example embodiment of the present invention, the handling device includes the coordination system. For example, the coordination system is integrated into the handling device. The coordination system is designed to activate the handling device, in particular the kinematic chains of the handling device.

It is particularly preferable for the kinematic chains to each be designed as a robot arm. The robot arms are, for example, articulated robot arms. Alternatively, the robot arms may also be designed as linear axes. The robot arms include joints, for example, the joints being adjustable and being able to be associated with their angles, for example, the trajectory data specifying the angle data and/or angle positions of the particular joints, for example.

The handling device is preferably designed as a robot. For example, the robot is a two-arm robot, a three-arm robot, or a multi-arm robot.

A method for coordinating a handling device including a plurality of kinematic chains forms a further subject matter of the present invention. In accordance with an example embodiment of the present invention, the method provides that trajectory data are determined for carrying out a work movement, the work movement being based on a work command. The handling device may be activated using the trajectory data, so that the handling device carries out the work movement. It is provided according to the method that if a further work command is provided and/or arrives, the handling device is still activated using the already existing trajectory data, replanned trajectory data being determined in parallel and/or simultaneously with the activation using the original trajectory data. The replanned trajectory data permit the further work command and/or old work command to be carried out. The replanned trajectory data furthermore permit the work movements to be carried out free of collisions.

A computer program, which is configured to carry out all steps of the above-described method, and a machine-readable, in particular nonvolatile machine-readable storage medium on which the described computer program is stored, form a further subject matter of the present invention.

Further features, advantages, and effects of the present invention result from the following description of preferred exemplary embodiments and the figures.

DETAILED DESCRIPTION OF EXAMPLE EMBODIMENTS

Figure 1:
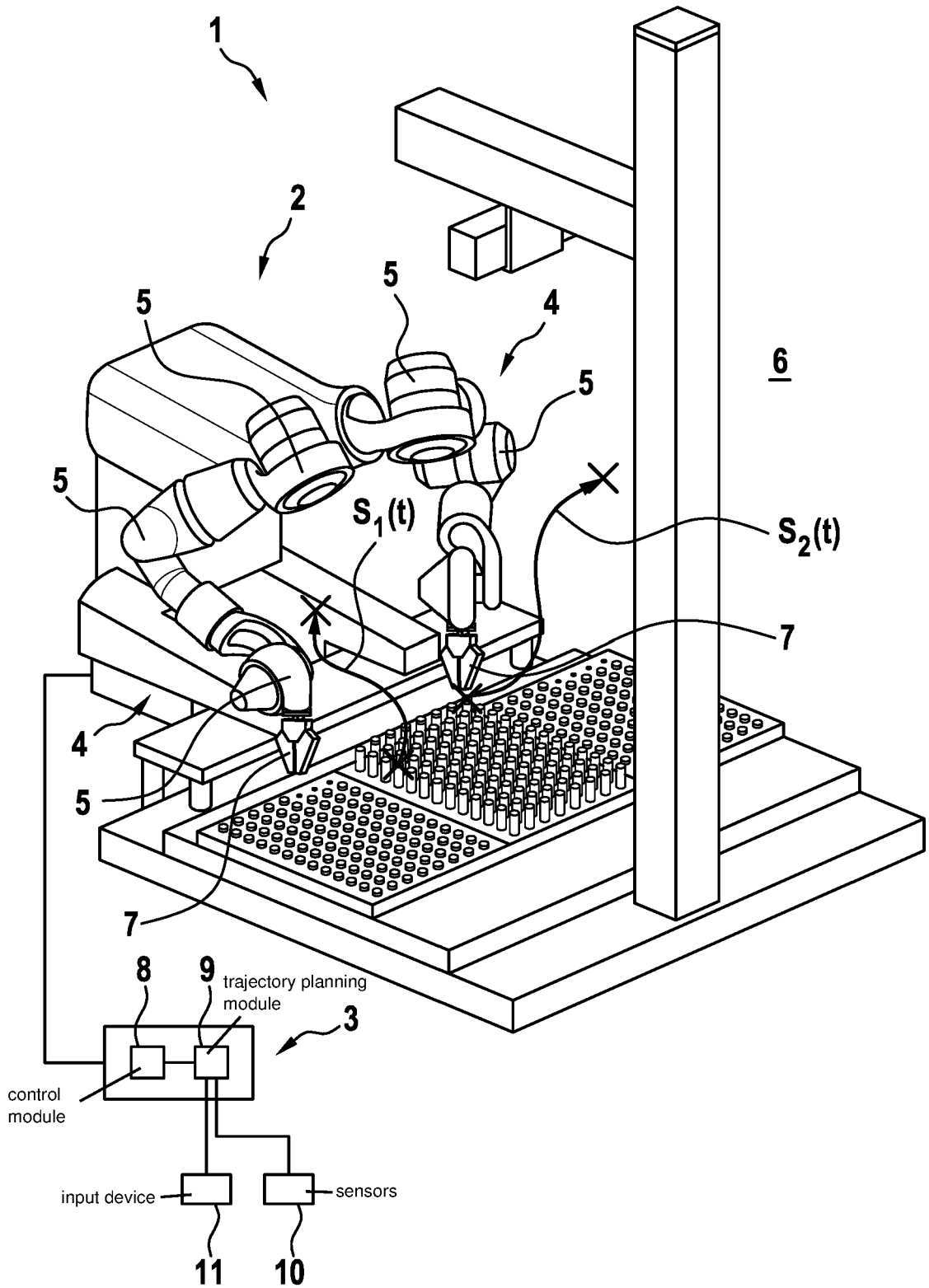
FIG. 1 shows a handling device as an exemplary embodiment of the present invention.

FIG. 1 shows a handling device 1. Handling device 1 includes a robot 2 or is designed as a robot 2. Handling device 1 furthermore includes a coordination system 3.

Robot 2 is designed as a multi-arm robot, in this example as a two-arm robot. Robot 2 and/or handling device 1 is part of an assembly place of a production system. Robot 2 is designed for processing and/or assembling an object, the object being a workpiece, for example. Robot 2 may grip, transport, and/or process the object.

Robot 2 includes two kinematic chains 4, kinematic chains 4 being formed by the robot arms and/or forming the robot arms. Kinematic chains 4 each include a plurality of joints 5, joints 5 being designed to enable an angle adjustment, so that the kinematic chains are each movable in workspace 6 with the aid of joints 5. Joints 5 are movable at an adjustment velocity and an adjustment acceleration, joints 5 having a maximum velocity and a maximum acceleration which restrict the possible trajectories and/or carrying out the trajectory. An end effector 7 is arranged at each of the free ends of kinematic chains 4. End effectors 7 are designed as grippers and may grip and/or manipulate the workpiece, for example.

Kinematic chains 4 are movable in workspace 6. End effector 7 is movable from a starting point along a movement path s(t) to an endpoint. The movement paths may be different for the two kinematic chains 4, for example, handling device 1 is designed to move one end effector along movement path s₁(t) and the other end effector along movement path s₂(t).

Handling device 1 includes a coordination system 3, coordination system 3 including a control module 8 and a trajectory planning module 9. Control module 8 is designed to activate robot 2 with the aid of trajectory data to carry out a work movement. The trajectory data are, for example, trajectory functions, the trajectory functions preferably being vector-valued functions which each have as many entries as kinematic chain 4 has joints 5. For example, a kinematic chain 4 includes three joints 5, the trajectory function then forming a three-component vector having, for example, three angle entries, the angle entries describing the angle position of joint 5. Furthermore, it is possible that the trajectory functions include the adjustment velocities and adjustment accelerations of joints 5 and take into consideration their limits.

Handling device 1 may include a plurality of sensors 10, sensors 10 monitoring, for example, the present status and/or the present work process of robot 2. For example, sensors 10 are video cameras or movement trackers of end effectors 7. Sensors 10 may provide sensor data to coordination system 3 and in particular to trajectory planning module 9. Handling device 1 and/or coordination system 3 includes an input device 11. With the aid of input device 11, for example, a user or an adjuster of handling device 1 may input a work command. The work command reads, for example: grip object A and transport it to point B. Trajectory planning module 9 includes and/or forms a trajectory coordinator, trajectory planning module 9 being designed to determine a trajectory based on the work command, the trajectory including in particular the maximum velocity and maximum accelerations. Furthermore, the trajectory planning module is designed to take into consideration the movements of all kinematic chains 4 of robot 2, so that the work command may be carried out free of collisions, the movement being free of collisions in particular with respect to the static surroundings. In particular, trajectory planning module 9 takes into consideration the sensor data of sensors 10. Trajectory planning module 9 is designed to provide the trajectory data, which describe the trajectory to be carried out, in control module 8.

If a new work command or a further work command is input, for example, using input device 11, trajectory planning module 9 is thus designed to at least temporarily continue to carry out the original and/or previously provided trajectory, control module 8 still activating robot 2 using the old trajectory data, and to determine replanned trajectory data, which take into consideration the further work command, during the further activation using the old trajectory data. The replanned trajectory data are provided to control module 8 only after replanning and robot 2 is activated using the new replanned trajectory data. Thus, during the planning of new replanned trajectory data, robot 2 is still operated using the original trajectory data, so that the operation of handling device 1 takes place preferably effectively.

Figure 2:
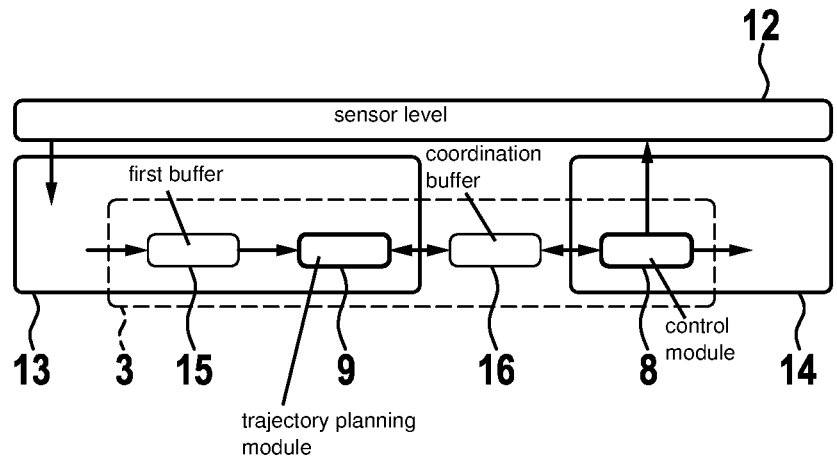
FIG. 2 shows the handling device in a sense-plan-act scheme in accordance with an example embodiment of the present invention.

FIG. 2 schematically shows the structure of handling device 1 according to the sense-plan-act scheme. The sense-plan-act scheme corresponds in particular to the measure-planning-execute model. This scheme provides that handling device 1 includes a sensor level 12, a planning level 13, and an execution level 14. A data exchange takes place in each case between sensor level 12, planning level 13, and/or execution level 14. In particular, the data exchange is cyclic and/or regular. Sensor level 12 provides that sensor data are ascertained with the aid of sensors 10. The sensor data are provided to planning level 13. In particular, the sensor data may be buffered in a first buffer 15. These sensor data are provided to trajectory planning module 9. Trajectory planning module 9 determines the trajectory for carrying out the work movement. Trajectory planning module 9 functions in particular as a trajectory coordinator, the trajectory coordinator being designed to replan and/or reparameterize the original trajectory data, so that the work movements may be carried out partially accelerated or decelerated. The thus ascertained trajectory data may be buffered in a coordination buffer 16. Coordination buffer 16 is especially formed by the trajectory buffer module. The trajectory data may then be passed on to control module 8. Control module 8 is in turn part of execution level 14. Control module 8 is designed to activate the robot based on the trajectory data and thus carry out the work movement. The robot may in turn provide feedback with the aid of the actuators, this provided feedback again being settled on sensor level 12.

While trajectory planning module 9 is part of planning level 13 and control module 8 is part of execution level 14, coordination system 3 is part of both levels 13 and 14. Coordination system 3 is thus structurally located in planning level 13 and execution level 14.

FIGS. 3a through 3i schematically show the sequence for coordinating handling device 1 with the aid of coordination system 2. A two-arm robot is used for this purpose as an example. The sequence is shown here in a coordination space. The abscissa of the coordination space forms the time axis of right arm $t_R$ and the ordinate forms the time axis of left arm $t_L$.

Figure 3A:
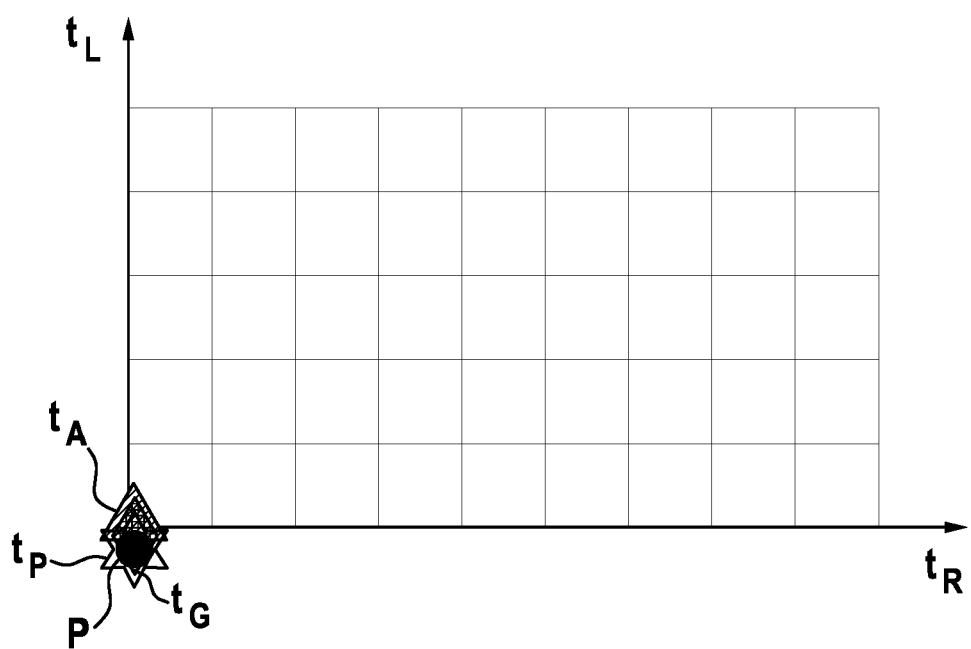
FIGS. 3a through 3i show the coordination sequence in accordance with an example embodiment of the present invention.

In FIG. 3a, robot 2 is stationary and does not carry out any work movements. All points in time are set to zero and/or at the origin. In particular, time coordinates are understood as points in time, for example, the time coordinates in the coordination space.

Figure 3B:
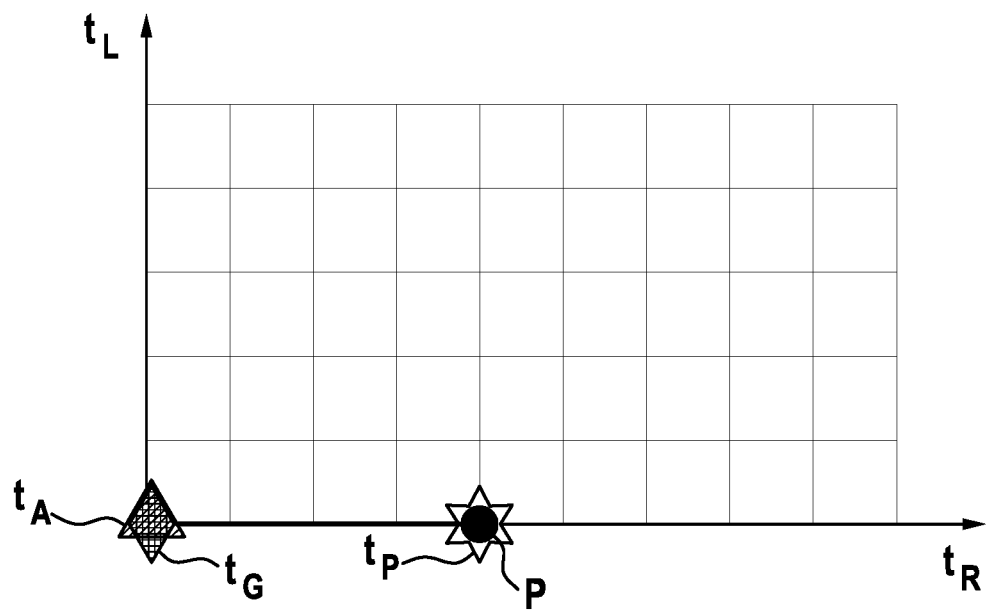

FIG. 3b shows a state in which a work command is provided for the right arm. Trajectory planning module 9 determines a trajectory for this purpose, which may be carried out free of collisions in the workspace. To carry out the work command and/or the work movement, the robot requires a certain time, so that a maximum execution point in time is establishable, which establishes point P. Point P is on the abscissa, since only one arm carries out a work movement and no work time elapses for the left arm. By establishing point P, in particular trajectory planning module 9 may determine the collision-free trajectory. The trajectory data are provided to control module 8.

Figure 3C:
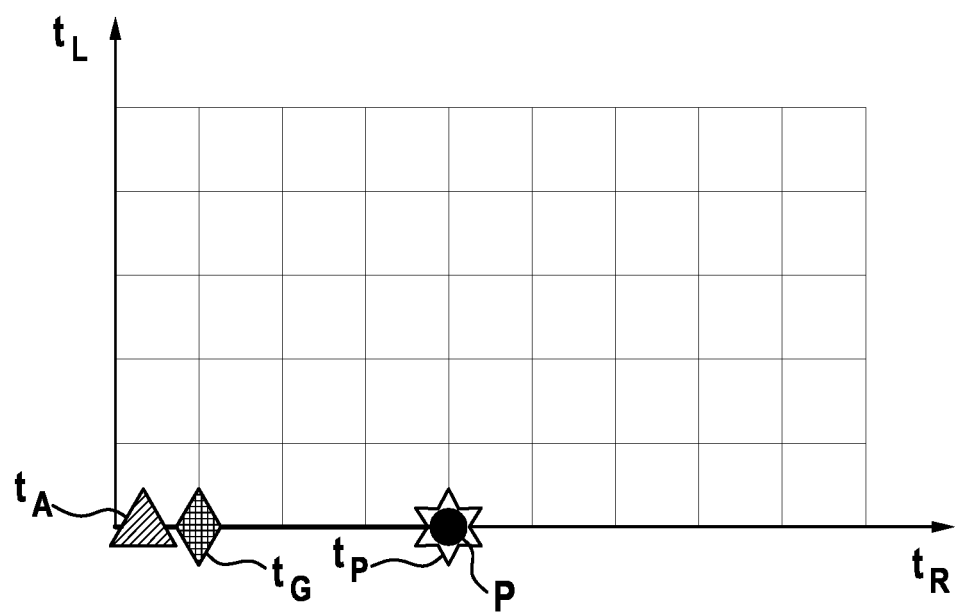

In FIG. 3c, the trajectory data are already provided to robot 2 and it begins to carry out the work movement. Present point in time $t_A$ extends during this work movement along the abscissa. Furthermore, a guarantee point in time $t_G$ is shown in FIG. 3c. Guarantee point in time $t_G$ is in the future with respect to time from present point in time $t_A$. Guarantee point in time $t_G$ is furthermore located between point P, which describes the maximum execution time, and present time $t_A$.

Figure 3D:
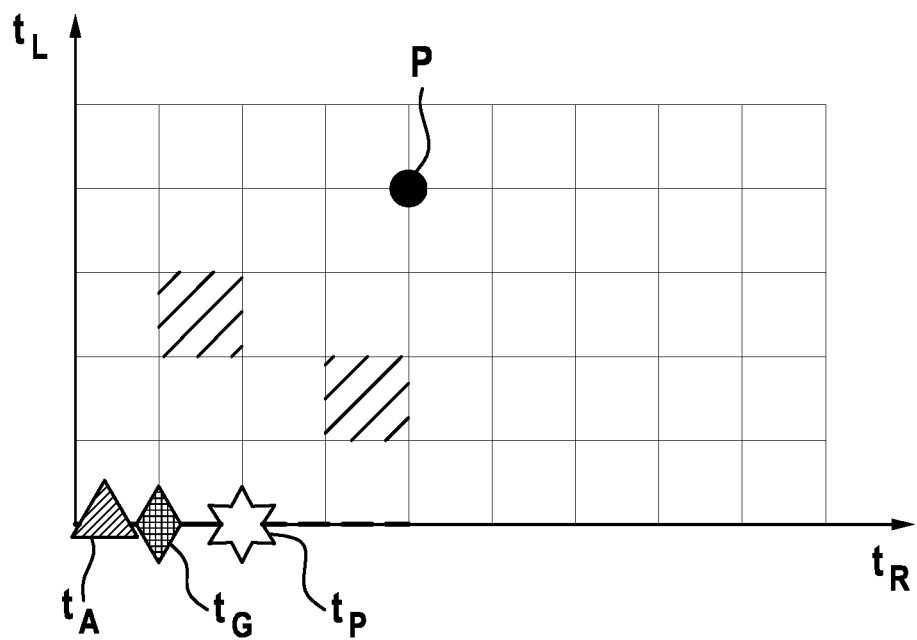

FIG. 3d shows a state in which a further work command is provided, the further work command relating to the left arm. Point P is set in the coordination space, point P bearing the maximum execution duration for the right arm and the maximum execution duration for the left arm as coordinates. Trajectory planning module 9 is designed to determine a trajectory to point P. However, since the robot has already carried out the first work movement up to the present point in time, planning from the origin to point P is not productive. To compute a new trajectory, coordination system 3 requires a planning time interval. The planning time interval is added starting from guarantee point in time $t_G$, so that a buffer point in time $t_P$ is obtained. The trajectory planning module is designed to determine the trajectory between buffer point in time $t_P$ and point P.

Figure 3E:
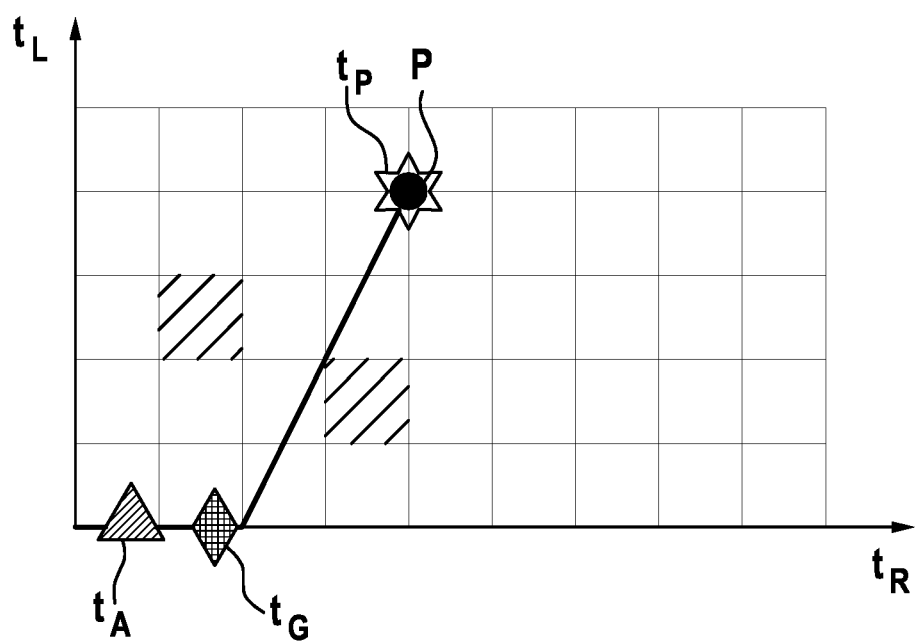

FIG. 3e shows the newly planned trajectory between buffer point in time $t_P$ and point P. Up to buffer point in time $t_P$, the handling device and/or the robot is still determined using the old trajectory data, so that the area between the origin and buffer point in time $t_P$ is secured for carrying out the original trajectory data.

Figure 3F:
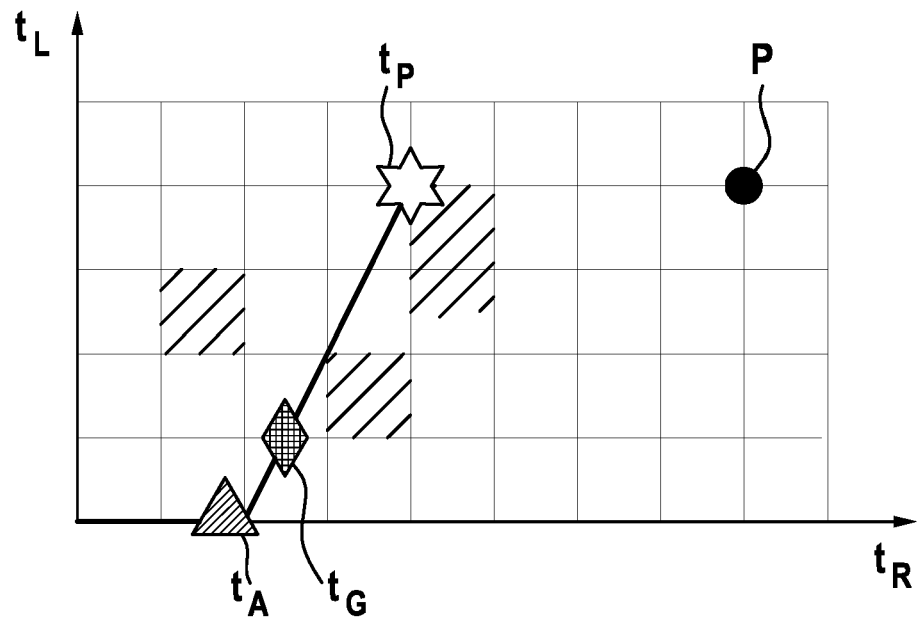

FIG. 3f shows a state in which a further work command is provided, the further work command now relating to the right arm. Point P is shifted in the coordination space, this new point P taking into consideration the new execution period of the right arm.

Figure 3G:
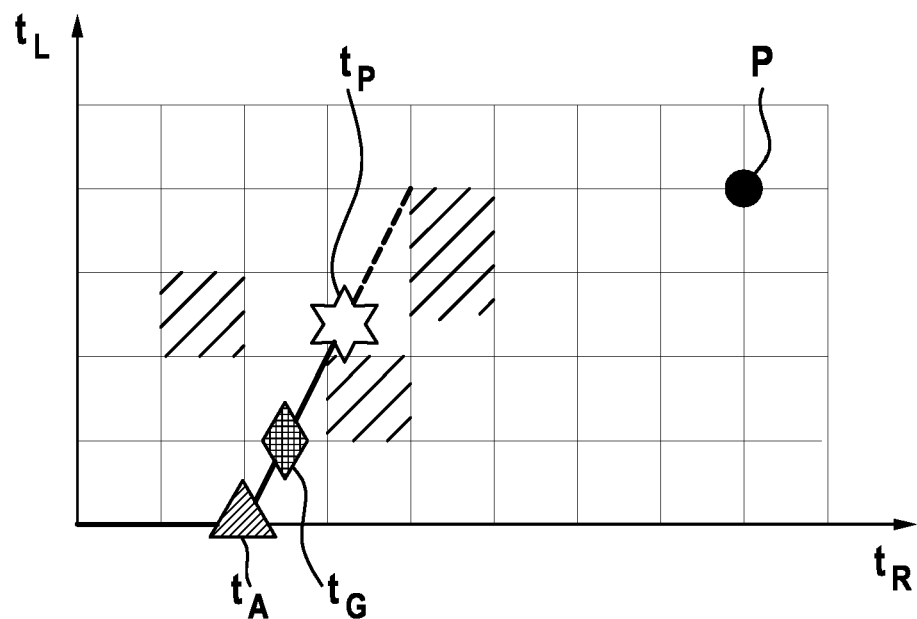

FIG. 3g now establishes a new buffer point in time $t_P$, $t_P$ now taking into consideration that carrying out the work movement has progressed further and present point in time $t_A$ has shifted. To determine buffer point in time $t_P$, the guarantee time interval and the planning time interval are added to present point in time $t_A$.

Figure 3H:
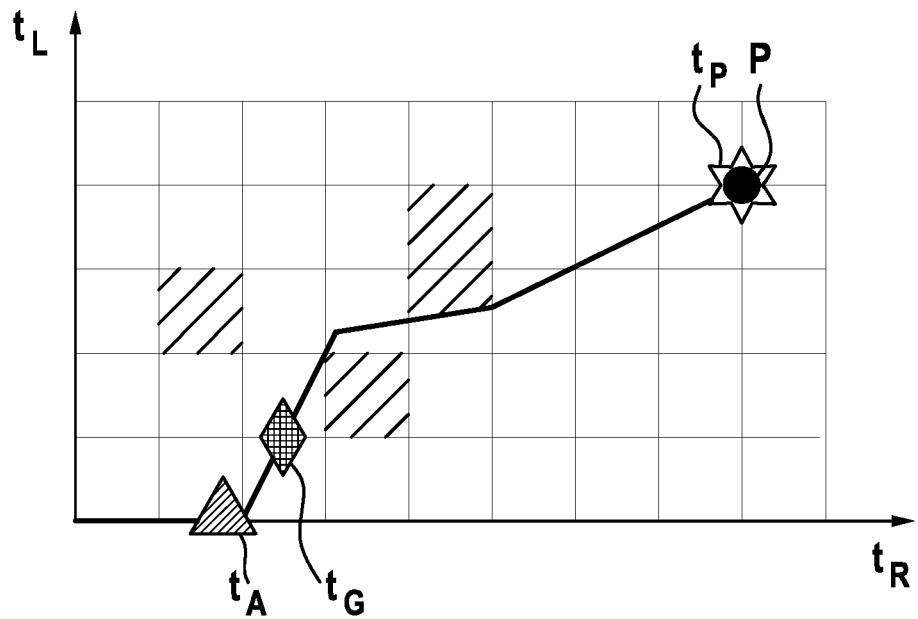

FIG. 3h shows a plan of the newly planned and/or reparameterized trajectories to reach point P, which takes into consideration all three work events. In order that the trajectories are free of collisions, the connection between buffer point in time $t_P$ and point P is not a straight line, but rather a bent path. This bent path in the coordination space represents the collision-free trajectories.

Figure 3I:
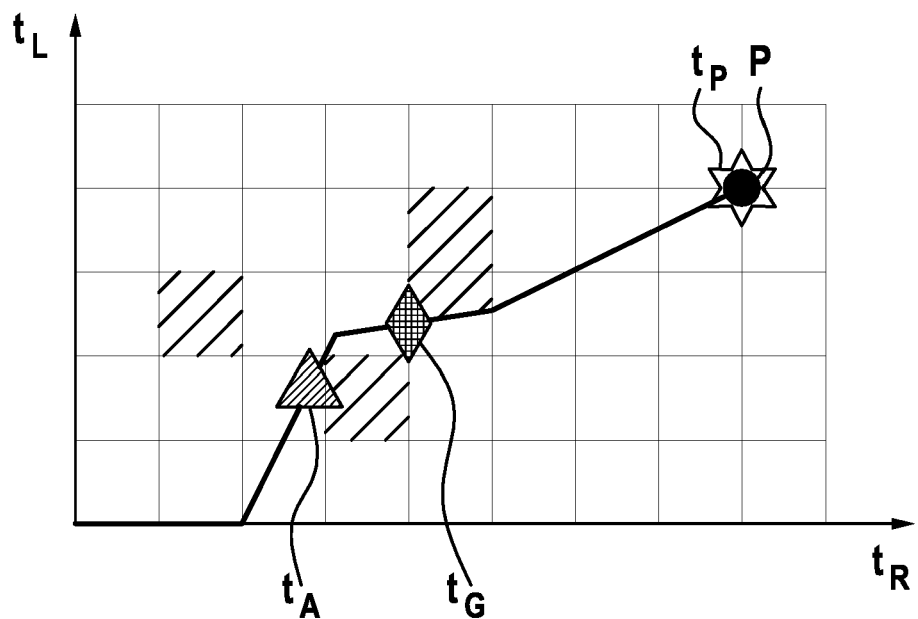

FIG. 3i shows the coordination space at a later present point in time $t_A$ and how guarantee point in time $t_G$ shifts with progressing present point in time $t_A$.

What is claimed is:

1. A coordination system for a handling device, comprising:
    a plurality of kinematic chains, each of the kinematic chains is configured to move in a respective workspace, at least two of the respective workspaces overlapping in a particular area, the kinematic chains being configured to carry out a work movement based on a work command;
    a trajectory planning module; and
    a control module to activate the kinematic chains to carry out the work movement based on a trajectory data;
    wherein the trajectory planning module is configured to determine the trajectory data to carry out the work movement and to provide the trajectory data to the control module, and the trajectory planning module is configured to replan the trajectory data into a replanned trajectory data and provide the replanned trajectory data to the control module, if a further work command is provided while the work movement is being carried out,
    wherein the replanned trajectory is implemented,
    wherein the trajectory data are trajectory functions, which are vector-valued functions that each have as many angle entries as a respective kinematic chain has joints,
    wherein the trajectory planning module is configured to replan the trajectory data only from a buffer point in time into the replanned trajectory data,
    wherein the buffer point in time is after an event point in time by a buffer time interval, the event point in time being a point in time at which the further work command is provided, and
    wherein the buffer point in time corresponds to a point in time calculated as the event point in time plus the buffer time interval plus a planning time interval.

2. The coordination system as recited in claim 1, wherein the control module is designed to activate the kinematic chains to carry out the work movement based on original trajectory data at least up to a guarantee point in time, the guarantee point in time being a point in time lying after the event point in time by a guarantee interval.

3. The coordination system as recited in claim 1, wherein the trajectory planning module is configured to determine a minimal time trajectory for each of the kinematic chains as preliminary trajectory data, the coordination system including a coordination module, the coordination module being configured so that work movements may be carried out free of collisions.

4. The coordination system as recited in claim 3, wherein the trajectory planning module is configured to determine the minimal time trajectory based on a finite maximum acceleration and/or a finite maximum velocity.

5. The coordination system as recited in claim 1, further comprising:
    a masking module configured to shield the trajectory data for the control module which are in replanning and/or have a later point in time than a maximum read ahead point in time.

6. The coordination system as recited in claim 5, further comprising:
    an estimation module configured to estimate a planning time interval, the planning time interval being a period of time for planning, and/or the reparameterizing, and/or the replanning the trajectory data.

7. A coordination system for a handling device, comprising:
    a plurality of kinematic chains, each of the kinematic chains is configured to move in a respective workspace, at least two of the respective workspaces overlapping in a particular area, the kinematic chains being configured to carry out a work movement based on a work command;
    a trajectory planning module;
    a control module to activate the kinematic chains to carry out the work movement based on a trajectory data;
    a masking module configured to shield the trajectory data for the control module which are in replanning and/or have a later point in time than a maximum read ahead point in time; and
    an estimation module configured to estimate a planning time interval, the planning time interval being a period of time for planning, and/or the reparameterizing, and/or the replanning the trajectory data;
    wherein the trajectory planning module is configured to determine the trajectory data to carry out the work movement and to provide the trajectory data to the control module, and the trajectory planning module is configured to replan the trajectory data into a replanned trajectory data and provide the replanned trajectory data to the control module, if a further work command is provided while the work movement is being carried out, and
    wherein the replanned trajectory is implemented,
    wherein the trajectory data are trajectory functions, which are vector-valued functions that each have as many angle entries as a respective kinematic chain has joints,
    wherein the trajectory planning module is configured to replan the trajectory data only from a buffer point in time into the replanned trajectory data, the buffer point in time being after an event point in time by a buffer time interval, the event point in time being a point in time at which the further work command is provided; and wherein the buffer point in time corresponds to the event point in time plus the buffer time interval plus the planning time interval and/or the maximum read ahead point in time corresponds to the event point in time plus the planning time interval.

8. A coordination system for a handling device, comprising:
a plurality of kinematic chains, each of the kinematic chains is configured to move in a respective workspace, at least two of the respective workspaces overlapping in a particular area, the kinematic chains being configured to carry out a work movement based on a work command;
a trajectory planning module;
a control module to activate the kinematic chains to carry out the work movement based on a trajectory data; and
an estimation module configured to estimate a planning time interval, the planning time interval being a period of time for planning, and/or the reparameterizing, and/or the replanning the trajectory data;
wherein the trajectory planning module is configured to determine the trajectory data to carry out the work movement and to provide the trajectory data to the control module, and the trajectory planning module is configured to replan the trajectory data into a replanned trajectory data and provide the replanned trajectory data to the control module, if a further work command is provided while the work movement is being carried out,
wherein the replanned trajectory is implemented,
wherein the trajectory data are trajectory functions, which are vector-valued functions that each have as many angle entries as a respective kinematic chain has joints,
wherein the trajectory planning module is configured to replan the trajectory data only from a buffer point in time into the replanned trajectory data, the buffer point in time being after an event point in time by a buffer time interval, the event point in time being a point in time at which the further work command is provided,
wherein the control module is configured to activate the kinematic chains to carry out the work movement based on original trajectory data at least up to a guarantee point in time, the guarantee point in time being a point in time lying after the event point in time by a guarantee interval, and
wherein the buffer point in time corresponds to the event point in time plus the guarantee interval plus the planning time interval.

9. The coordination system as recited in claim 5, wherein:
the trajectory planning module is configured to replan the trajectory data only from a buffer point in time into the replanned trajectory data, the buffer point in time being after an event point in time by a buffer time interval, the event point in time being a point in time at which the further work command is provided; and
the buffer point in time is less than or equal to the maximum read ahead point in time.

10. The coordination system as recited in claim 1, wherein each of the kinematic chains is a robot arm.

11. A handling device, comprising:
a coordination system, including:
a plurality of kinematic chains, each of the kinematic chains is configured to move in a respective workspace, at least two of the respective workspaces overlapping in a particular area, the kinematic chains being configured to carry out a work movement based on a work command;
a trajectory planning module; and
a control module configured to activate the kinematic chains to carry out the work movement based on a trajectory data;
wherein the trajectory planning module is configured to determine the trajectory data to carry out the work movement and to provide the trajectory data to the control module, and the trajectory planning module is configured to replan the trajectory data into a replanned trajectory data and provide the replanned trajectory data to the control module, if a further work command is provided while the work movement is being carried out, and
wherein the replanned trajectory is implemented,
wherein the trajectory data are trajectory functions, which are vector-valued functions that each have as many angle entries as a respective kinematic chain has joints,
wherein the trajectory planning module is configured to replan the trajectory data only from a buffer point in time into the replanned trajectory data,
wherein the buffer point in time is after an event point in time by a buffer time interval, the event point in time being a point in time at which the further work command is provided, and
wherein the buffer point in time corresponds to a point in time calculated as the event point in time plus the buffer time interval plus a planning time interval.

12. A method for coordinating a handling device including a coordination system, the method comprising:
determining first trajectory data for carrying out a work movement, the work movement being based on a work command;
activating the handling device using the first trajectory data; and
determining, when a further work command is provided and/or arrives and the handling device is still activated using the first trajectory data, replanned trajectory data in parallel to and/or simultaneously with the activating using the first trajectory data, and
implementing the replanned trajectory;
wherein the trajectory data are trajectory functions, which are vector-valued functions that each have as many angle entries as a respective kinematic chain has joints,
wherein the trajectory data is replanned only from a buffer point in time into the replanned trajectory data,
wherein the buffer point in time is after an event point in time by a buffer time interval, the event point in time being a point in time at which the further work command is provided, and
wherein the buffer point in time corresponds to a point in time calculated as the event point in time plus the buffer time interval plus a planning time interval.

13. A non-transitory machine-readable storage medium, on which is stored a computer program, which is executable by a processor, comprising:
a program code arrangement having program code for coordinating a handling device including a coordination system, by performing the following:
determining first trajectory data for carrying out a work movement, the work movement being based on a work command;
activating the handling device using the first trajectory data; and determining, when a further work command is provided and/or arrives and the handling device is still activated using the first trajectory data, replanned trajectory data in parallel to and/or simultaneously with the activating using the first trajectory data, and implementing the replanned trajectory;

wherein the trajectory data are trajectory functions, which are vector-valued functions that each have as many angle entries as a respective kinematic chain has joints, wherein the trajectory data is replanned only from a buffer point in time into the replanned trajectory data, wherein the buffer point in time is after an event point in time by a buffer time interval, the event point in time being a point in time at which the further work command is provided, and wherein the buffer point in time corresponds to a point in time calculated as the event point in time plus the buffer time interval plus a planning time interval.

14. The coordination system as recited in claim 1, wherein each of the kinematic chains includes a plurality of joints, each of the joints enabling an angle adjustment and being movable at an adjustment velocity and an adjustment acceleration, so that the kinematic chains are each movable in the workspace with the aid of the joints.

15. The coordination system as recited in claim 1, wherein each of the kinematic chains includes a plurality of joints, each of the joints has a maximum velocity and a maximum acceleration which restrict possible trajectories and/or carry out the trajectory, and wherein an end effector is arranged at each free end of each of the kinematic chains.

16. The coordination system as recited in claim 15, wherein one of the end effectors moves along a first movement path and another of the end effectors moves along another movement path.

\* \* \* \* \*